(12) United States Patent
Vellaichamy

(10) Patent No.: US 12,713,333 B2
(45) Date of Patent: Aug. 18, 2026

(54) COORDINATION OF PROBE RESPONSE RESTRICTIONS IN MULTIPLE WI-FI 7 ACCESS POINT ON A WLAN

(71) Applicant: Fortinet, Inc., Sunnyvale, CA (US)

(72) Inventor: Vijayakumar Vellaichamy, Jogupalaya (IN)

(73) Assignee: Fortinet, Inc., Sunnyvale, CA (US)

( * ) Notice: Subject to any disclaimer, the term of this patent is extended or adjusted under 35 U.S.C. 154(b) by 295 days.

(21) Appl. No.: 18/373,624

(22) Filed: Sep. 27, 2023

(65) Prior Publication Data

US 2025/0106737 A1 Mar. 27, 2025

(51) Int. Cl.
*H04W 48/14* (2009.01)
*H04W 48/16* (2009.01)

(52) U.S. Cl.
CPC .......... *H04W 48/14* (2013.01); *H04W 48/16* (2013.01)

(58) Field of Classification Search
CPC ...... H04W 48/14; H04W 48/16; H04W 48/20
See application file for complete search history.

(56) References Cited

U.S. PATENT DOCUMENTS 12,120,760 B2 * 10/2024 Chu ..................... H04W 76/15

* cited by examiner

*Primary Examiner* — Diane D Mizrahi
(74) *Attorney, Agent, or Firm* — Law Office of Dorian Cartwright; Dorian Cartwright

(57) ABSTRACT

A Wi-Fi controller receives notification of a probe request of a station that was received from each at least two of the at least two of the two or more Wi-Fi 7 access points of a multiple access point coordination group. The probe requests are each sourced from the station while within the at least partially overlapped radio signal coverage area. The Wi-Fi controller selects one of the at least two of the two or more access points to respond to the probe request with a probe response with a single probe response to the station, in response to the multiple probe requests, by notifying the selected access point to send the single probe response including an RNR (reduced neighbor report) data providing connection information for the at least two access points. The other of the at least two Wi-Fi 7 access points refrain from sending additional probe responses to the station.

20 Claims, 5 Drawing Sheets

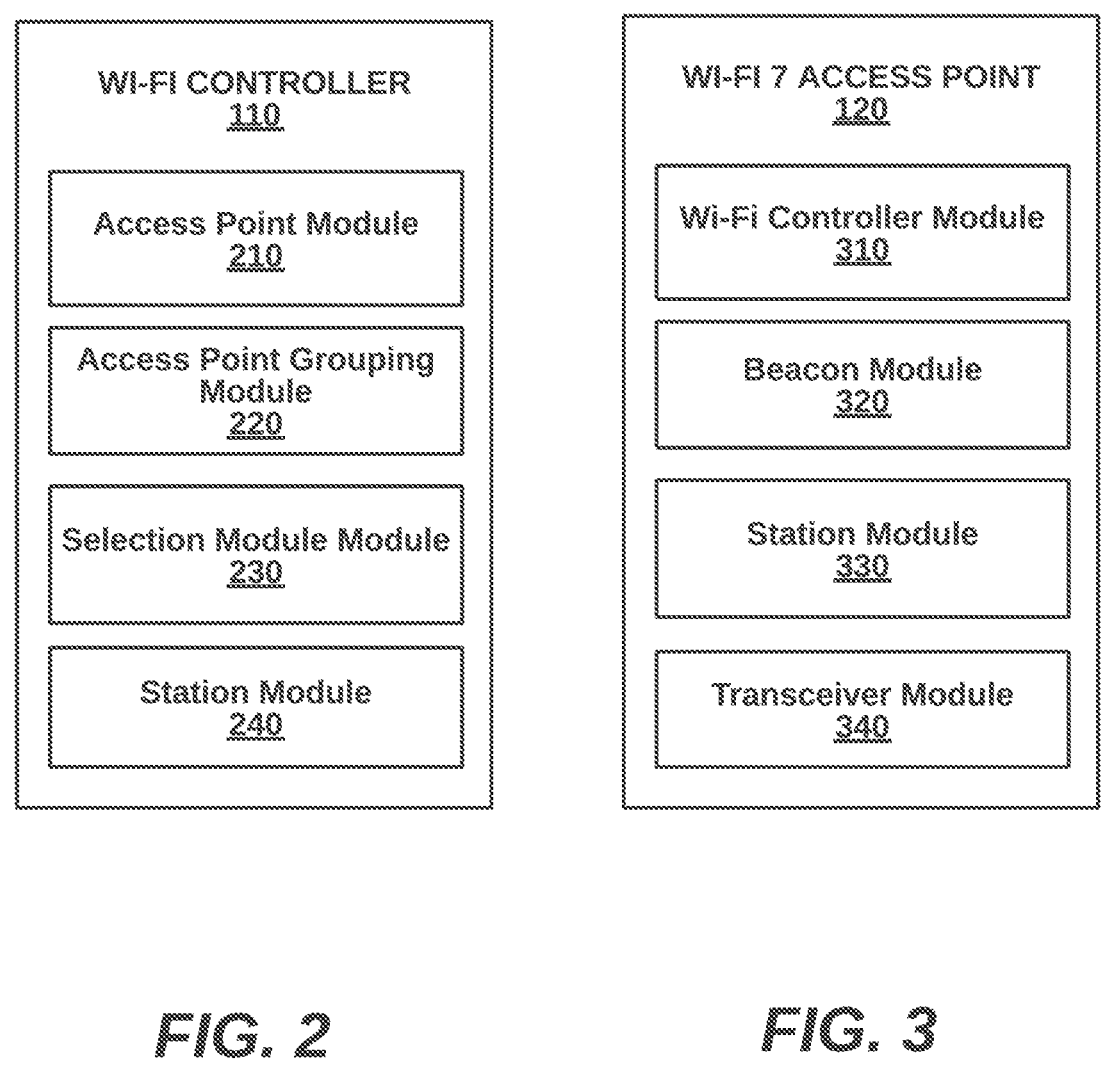

WI-FI CONTROLLER
110

Access Point Module
210

Access Point Grouping Module
220

Selection Module Module
230

Station Module
240

FIG. 2

WI-FI 7 ACCESS POINT
120

Wi-Fi Controller Module
310

Beacon Module
320

Station Module
330

Transceiver Module
340

FIG. 3

COORDINATION OF PROBE RESPONSE RESTRICTIONS IN MULTIPLE WI-FI 7 ACCESS POINT ON A WLAN

FIELD OF THE INVENTION

The invention relates generally to computer networks, and more specifically, for coordinating a restriction of probe responses from multiple WI-FI 7® (Wi-Fi 7) access point on a WLAN (Wireless Local Access Network) receiving a probe request from a station

BACKGROUND

In a crowded wireless environment, there may be multiple access points within communication range of the wireless clients. When these access points receive the probe request, all of them typically respond by transmitting probe responses. These duplicitous probe responses often degrade the communication performance from the additional overhead.

Some current solutions aim for network control of a station connection itself. To do so, they limit visibility of which access point are sending beacons, or direct which access point should connect with the station, for the network side. However, Wi-Fi protocols are typically set up for stations to decide which access point is best for connections, and current solutions preclude this process.

What is needed is a robust technique for coordinating a restriction of probe responses from multiple Wi-Fi 7 access point receiving a probe request from a station.

SUMMARY

To meet the above-described needs, methods, computer program products, and systems for coordinating a restriction of probe responses from multiple Wi-Fi 7 access point receiving a probe request from a station.

In one embodiment, a Wi-Fi controller connects to a plurality Wi-Fi 7 access points over the data communication network. Multiple access point coordination group are formed from two or more of the plurality of Wi-Fi 7 access points. The two or more of the plurality of Wi-Fi 7 access points at least partially overlap in radio signal coverage area.

In another embodiment, a probe request of a station is received from each at least two of the at least two of the two or more Wi-Fi 7 access points of a multiple access point coordination group. The probe requests are each sourced from the station while within the at least partially overlapped radio signal coverage area. The Wi-Fi controller selects one of the at least two of the two or more access points to respond to the probe request with a probe response, based at least on an RSSI (radio signal strength indicator) value associated with the probe requests.

In still another embodiment, a single probe response to the station, in response to the multiple probe requests, by notifying the selected access point to send the single probe response including an RNR (reduced neighbor report) data providing connection information for the at least two access points. The other of the at least two Wi-Fi 7 access points refrain from sending additional probe responses to the station.

Advantageously, computer performance is improved with more efficient use of processing resources and network performance is improved with more efficient use of wireless bandwidth.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a Wi-Fi 7 access point of the system of FIG. 1, according to one embodiment.

FIG. 3 is a more detailed block diagram illustrating a Wi-Fi 7 access point of the system of FIG. 1, according to one embodiment.

DETAILED DESCRIPTION

Methods, computer program products, and systems for coordinating a restriction of probe responses from multiple Wi-Fi 7 access point receiving a probe request from a station. The following disclosure is limited only for the purpose of conciseness, as one of ordinary skill in the art will recognize additional embodiments given the ones described herein.

I. Systems for Probe Response Restriction (FIGS. 1-3)

Figure 1:
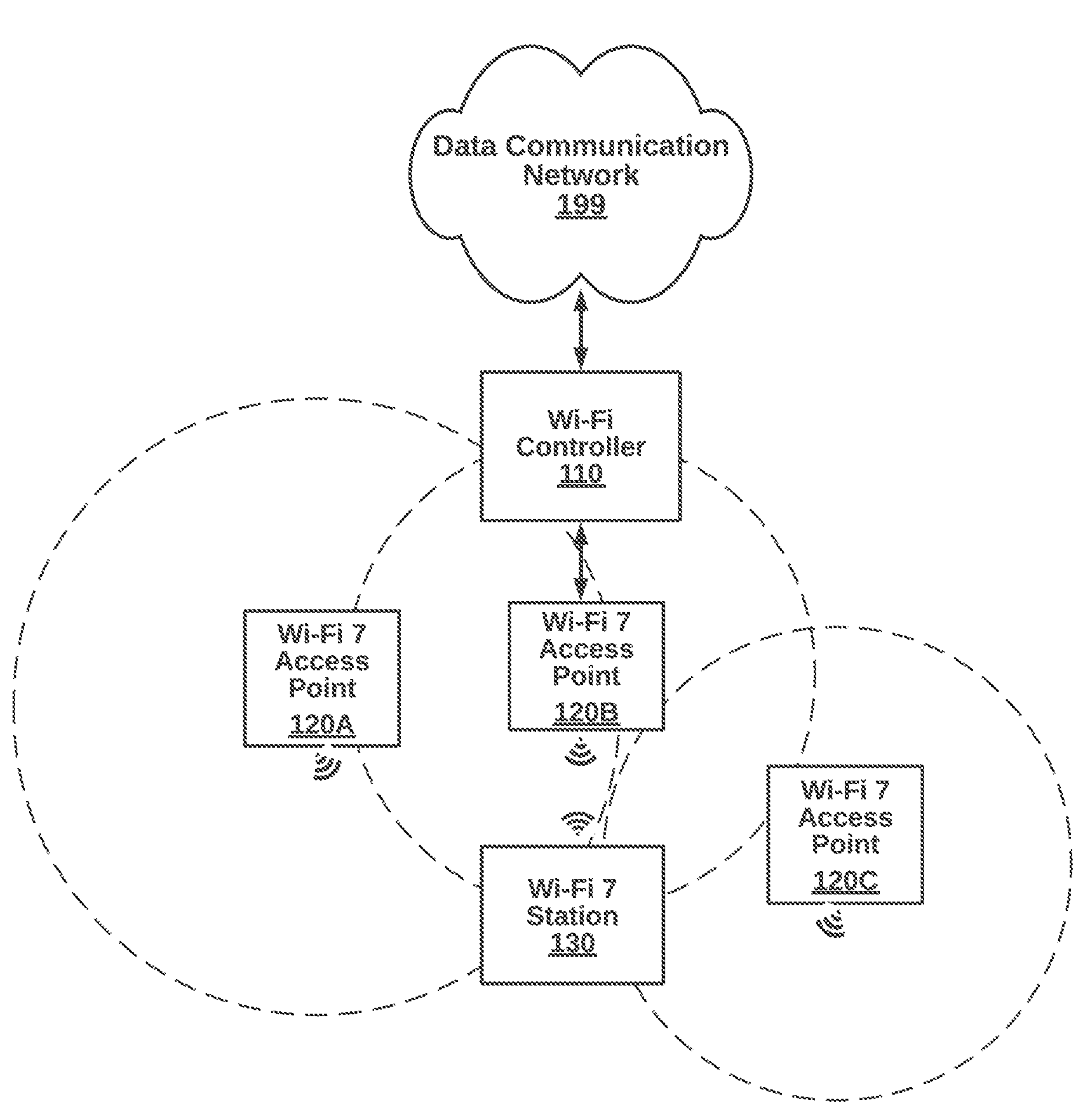
FIG. 1 is a high-level block diagram illustrating a system coordinating a restriction of probe responses from multiple Wi-Fi 7 access points receiving a probe request from a station on a WLAN, according to some embodiments.
Figure 6:
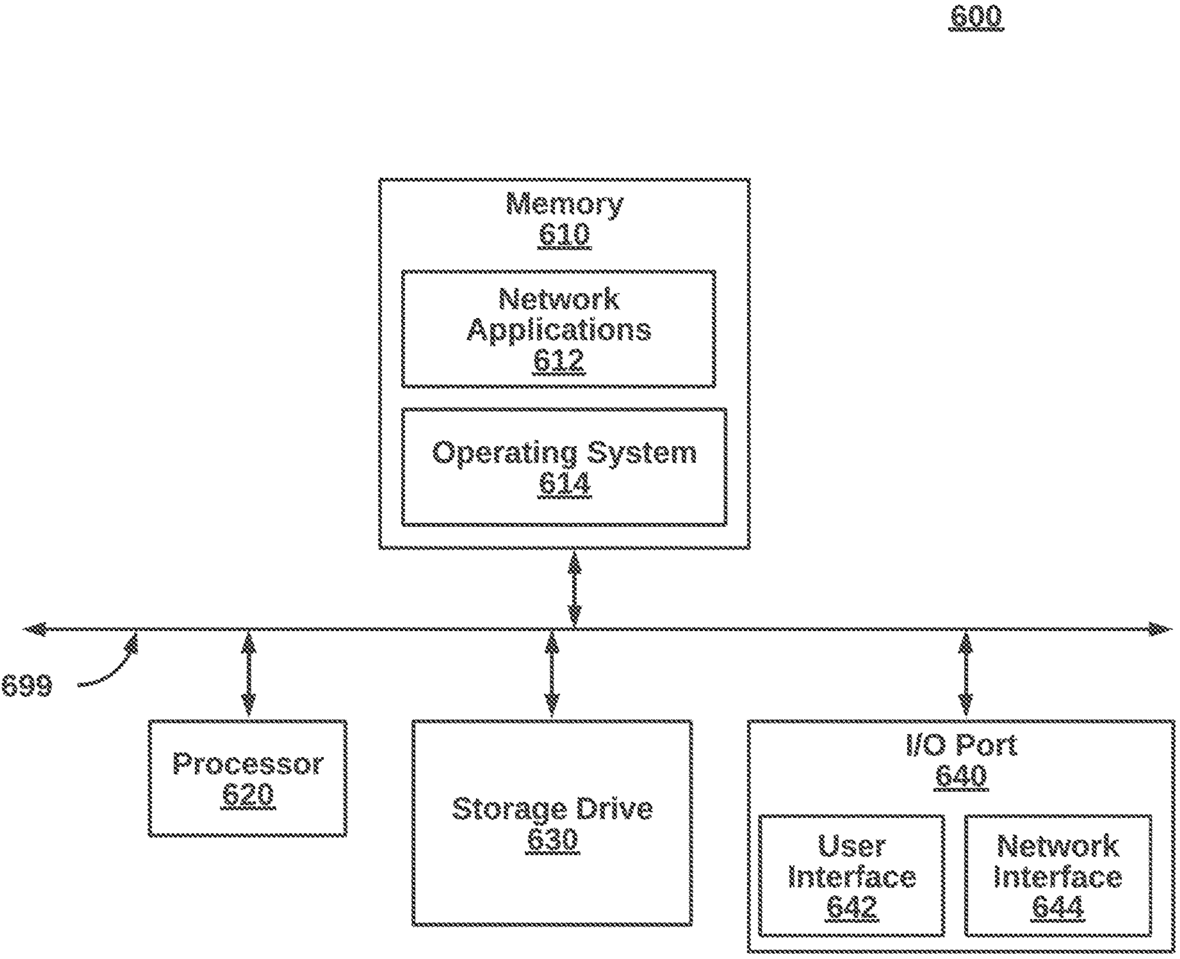
FIG. 6 is a block diagram illustrating an example computing device for the system of FIG. 1, according to one embodiment.

FIG. 1 is a high-level block diagram illustrating a system 100 for coordinating a restriction of probe responses from multiple Wi-Fi 7 access point receiving a probe request from a station, according to an embodiment. The system 100 includes a Wi-Fi controller 110, access points 120A, 120B, 120C and station 130. Other embodiments of the system 100 can include additional components that are not shown in FIG. 1, such as controllers, network gateways, firewalls, access points and stations. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network. The components can be connected to the data communication system via hard wire (e.g., Wi-Fi controller 110 and Wi-Fi 7 access points 120A, 120B, 120C). The components can also be connected via wireless networking (e.g., station 130). The data communication network can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or IPv6 address spaces.

The Wi-Fi controller 110 selects which of the Wi-Fi 7 access points 120A, 120B and 120C should respond to the station 130 with a single probe response when a probe request is received by more than one. Further, the unselected stations can be affirmatively notified to preclude sending a probe response, in contradiction to normal protocol processes. In one implementation, the single probe response feature can be toggled on and off as needed. For example, if there are no overlapping radio ranges between access points, the additional overhead may be unnecessary. At a predetermine threshold of access point density or actual radio range overlap, restrictions can be automatically or manually activated. In one case, if more than one copy of a probe request is received, restriction is automatically enabled. In another case, three or four copies of probe requests are required. Below, the Wi-Fi controller 110

The Wi-Fi access points 120A, 120B, 120C respond to a probe request received by multiple devices with a single probe response. Generally, access points advertise connection abilities to stations using beacons, and respond to stations requesting a connection. The beacons include a BSSID along with other information, such as available services, and are periodically broadcast over an RF range. When a probe request is received by all three access points, each reports upstream to the Wi-Fi controller 110. Once a selection is made, the Wi-Fi controller 110 notifies which device should transmit a single probe response to the station, and alternatively, can notify the unselected devices to not send a probe response. In Wi-Fi 7, RNR reports are also included which provide data about nearby access points and other non-Wi-Fi 7 connections (i.e., legacy connections) available on Wi-Fi 7 access points. The RNR data can be gathered from observing nearby communications or can be provided by the Wi-Fi controller 110.

The station 130 connects to nearby access points over wireless channels for uploading and downloading data from the data communication network. Some data is exchanged local to a LAN and other data is exchanged outside the LAN over the Internet. To initiate a connection, the station 130 can select an access point and send a probe request with a corresponding BSSID embedded. Then the station 130 receives a probe response from just one of the receiving access points, as the others have been restricted from responding by the Wi-Fi controller 110. The probe response includes an RNR containing connection information for nearby access points that has been gathered. In turn, the station 130 selects an access point through a corresponding BSSID to use for connecting to the backbone network. In one embodiment, the selected access point for connection is different from the access point selected for the single probe response. Once connected, data can be transmitted to destinations and received from sources on networks.

FIG. 2 is a more detailed block diagram illustrating the Wi-Fi controller 110 of the system of FIG. 1, according to one embodiment. The Wi-Fi controller 110 includes an access point module 210, an access point grouping module 220 and a selection module 230. The components can be implemented in hardware, software, or a combination of both.

The access point module 210 connects with the plurality of Wi-Fi 7 access points on the data communication network. Some access points are also compatible with Wi-Fi 6 and Wi-Fi 5. The access point module 210 receives a probe request from each at least two of the at least two of the two or more Wi-Fi 7 access points. The probe requests are each sourced from the station while within the at least partially overlapped radio signal coverage area. In turn, the probe request are transmitted upstream to the Wi-Fi controller 110 for processing.

The access point grouping module 220 can form a multiple access point coordination group from two or more of the plurality of Wi-Fi 7 access points. The two or more of the plurality of Wi-Fi 7 access points at least partially overlap in radio signal coverage area. Many different algorithms can be implemented choosing which access points should be grouped together. One embodiment identifies all combinations of overlapping RF ranges. Each of the overlapping areas of coverage define groups. In one implementation, a network administrator defines groups manually. In still another implementation, groups are automatically formed on-the-fly responsive to request probes. Real-time network statistics (e.g., total number of stations, total number of access points and interference levels) and real-time device conditions (e.g., processing load, capacity of queue, and throughput) can be measure.

The selection module 230 can select one of the at least two of the two or more access points to respond to the probe request with a probe response, based at least on an RSSI value associated with the probe requests. A single probe response is transmitted to the station, in response to the multiple probe requests, by notifying the selected access point to send the single probe response including an RNR (reduced neighbor report) data providing connection information for the at least two access point. The other of the at least two Wi-Fi 7 access points refrain from sending additional probe responses to the station.

FIG. 3 is a more detailed block diagram illustrating the Wi-Fi 7 access point 120 (representative of Wi-Fi 7 access points 120A, 120B and 120C of the system of FIG. 1, according to one embodiment. The Wi-Fi 7 access point 120 a Wi-Fi controller module 310 to communicate and implement instructions from the Wi-Fi controller 310. A beacon module 320 generates beacons for advertising availability and capability of connections. In some cases, the beacon module 320 receives instructions from the Wi-Fi controller 310 to refrain from sending a probe response corresponding to a probe request, or instructions to send a single probe response on behalf of the multiple access point group. A station module 330 connects and manages the station 130 and other stations. For example, stations need to associate and authenticate with the Wi-Fi 7 access point. A user can be verified with login credentials for access to a data communication network. Additionally, upstream and downstream sessions can be managed individually. A transceiver module 340 can packetized data according to Wi-Fi 7 and other protocols and use transceivers to wirelessly access the channel. These components can also be implemented in hardware, software, or a combination of both.

II. Methods for Probe Response Restriction (FIGS. 4-5)

Figure 4:
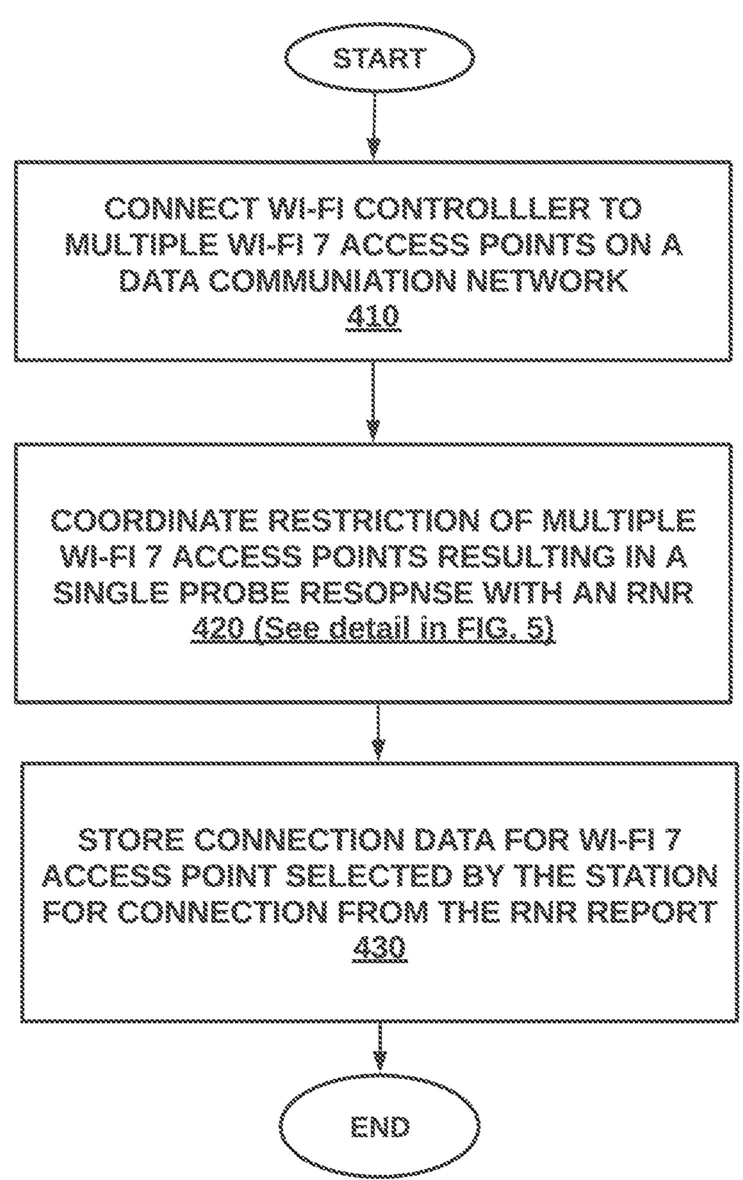
FIG. 4 is a high-level flow diagram illustrating a method for coordinating a restriction of probe responses from multiple Wi-Fi 7 access point receiving a probe request from a station, according to an embodiment.

FIG. 4 is a high-level flow diagram of a method 400 for connecting stations in a multiple Wi-Fi 7 access point network architecture, according to an embodiment. The method 400 can be implemented by, for example, system 100 of FIG. 1. The specific grouping of functionalities and order of steps are a mere example as many other variations of method 400 are possible, within the spirit of the present disclosure.

Specifically, at step 410, a Wi-Fi controller connects to multiple access points on a data communication network. At step 420, a restriction of probe responses from multiple Wi-Fi 7 access points is coordinated after receiving a probe request from a station, resulting in a single probe response with an RNR, as discussed in more detail below. At step 430, the Wi-Fi controller stores connection data for the station, concerning which Wi-Fi 7 access point the station selected from the RNR report.

Figure 5:
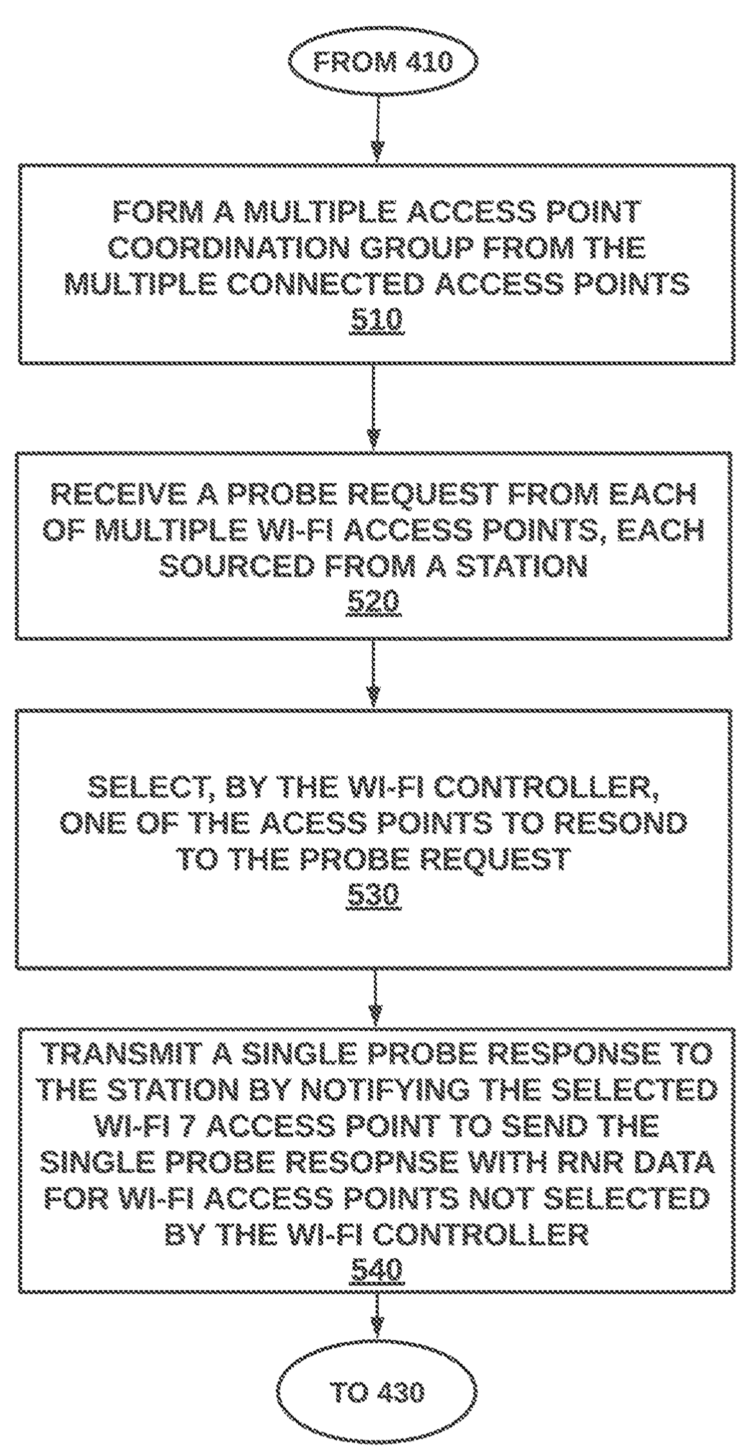
FIG. 5 is a more detailed flow diagram illustrating a step for connecting stations in a multiple Wi-Fi 7 access point network architecture, from the method of FIG. 4, according to one embodiment.

FIG. 5 is a more detailed flow diagram detailing the step 420 of coordinating a restriction of probe responses from multiple Wi-Fi 7 access points receiving a probe request from a station. Other variations are possible for different implementations.

At step 510, a probe request is received from each at least two of the at least two of the two or more Wi-Fi 7 access points. The probe requests are each sourced from the station while within the at least partially overlapped radio signal coverage area.

At step 520, one of the at least two of the two or more access points is selected to respond to the probe request with a probe response, based at least on an RSSI value associated with the probe request. The RSSI values can be measured by access point hardware at receipt and results embedded in data sent upstream to a Wi-Fi controller. Other implementation-specific selection factors can include load balancing, network policies or type of station, for example.

At step 530, a single probe response is transmitted to the station, in response to the multiple probe requests, by notifying the selected access point to send the single probe response including an RNR data providing connection information for the at least two access points. The other of the at least two Wi-Fi 7 access points refrain from sending additional probe responses to the station.

III. Computing Device for Probe Response Restriction (FIG. 6)

FIG. 6 is a block diagram illustrating a computing device 600 for use in the system 100 of FIG. 1, according to one embodiment. The computing device 600 is a non-limiting example device for implementing each of the components of the system 100, including the Wi-Fi controller 110, the Wi-Fi 7 access points 120A, 120B, 120C and the station 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICS)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a Wi-Fi controller communicatively coupled to a plurality of WI-FI 7® (Wi-Fi 7) access points on a data communication network, coordinating a restriction of probe responses the plurality of Wi-Fi 7 access point receiving a probe request from a station, the method comprising:

- connecting with the plurality of Wi-Fi 7 access points over the data communication network;
- forming a multiple access point coordination group from two or more of the plurality of Wi-Fi 7 access points, wherein the two or more of the plurality of Wi-Fi 7 access points at least partially overlap in radio signal coverage area;
- receiving a probe request of the station from each at least two of the at least two of the two or more Wi-Fi 7 access points, wherein the probe requests are each sourced from the station while within the at least partially overlapped radio signal coverage area;
- selecting one of the at least two of the two or more access points to respond to the probe request with a probe response, based at least on an Received Signal Strength Indicator (RSSI) value associated with the probe requests; and
- transmitting a single probe response to the station, in response to the multiple probe requests, by notifying the selected access point to send the single probe response including a Reduced Neighbor Report (RNR) data providing connection information for the at least two access points, and wherein the other of the at least two Wi-Fi 7 access points refrain from sending additional probe responses to the station.

2. The method of claim 1, wherein the a first probe request received from a first Wi-Fi 7 access point and a second probe request received from a second Wi-Fi 7 access point have a common BSSID, wherein the first and second Wi-Fi 7 access points are from the multiple access point coordination group.

3. The method of claim 1, wherein a first probe request received from a first Wi-Fi 7 access point and a second probe request received from a second Wi-Fi 7 access point have different BSSIDs, wherein the first and second Wi-Fi 7 access points are from the multiple access point coordination group.

4. The method of claim 1, wherein the step of creating the multiple access point coordination group is automatically created based on at least current network statistics and current access point conditions concerning the plurality of Wi-Fi 7 access points.

5. The method of claim 1, wherein the step of selecting one of the at least two of the two or more access points to respond is based on at least current network statistics and current access point conditions concerning the at least two access points.

6. The method of claim 1, further comprising: generating the RNR data by the selected access point, wherein the RNR data includes a BSSID of at least one access point not selected to transmit the single probe response.

7. The method of claim 1, further comprising receiving notification of a connection request from the station, to connect to an access point included in the RNR, although not selected to transmit the single probe response.

8. The method of claim 1, wherein the step of creating a multiple access point coordination group is on-the-fly in response to receiving the probe request.

9. The method of claim 1, wherein responsive to having information for synchronous evaluation, redirecting, by the web extension, the web request to display a web page to bypass the browser extension holding page.

10. A non-transitory computer-readable medium in a Wi-Fi controller communicatively coupled to a plurality of WI-FI 7® (Wi-Fi 7) access points on a data communication network, coordinating a restriction of probe responses the plurality of Wi-Fi 7 access point receiving a probe request from a station, the method comprising:

- connecting with the plurality of Wi-Fi 7 access points over the data communication network;
- forming a multiple access point coordination group from two or more of the plurality of Wi-Fi 7 access points, wherein the two or more of the plurality of Wi-Fi 7 access points at least partially overlap in radio signal coverage area;
- receiving a probe request of the station from each at least two of the at least two of the two or more Wi-Fi 7 access points, wherein the probe requests are each sourced from the station while within the at least partially overlapped radio signal coverage area;

selecting one of the at least two of the two or more access points to respond to the probe request with a probe response, based at least on an Received Signal Strength Indicator (RSSI) value associated with the probe requests; and transmitting a single probe response to the station, in response to the multiple probe requests, by notifying the selected access point to send the single probe response including a Reduced Neighbor Report (RNR) data providing connection information for the at least two access points, and wherein the other of the at least two Wi-Fi 7 access points refrain from sending additional probe responses to the station.

11. A Wi-Fi controller communicatively coupled to a plurality of WI-FI 7® (Wi-Fi 7) access points on a data communication network, coordinating a restriction of probe responses the plurality of Wi-Fi 7 access point receiving a probe request from a station, the Wi-Fi controller comprising:

a processor;

a network interface communicatively coupled to the processor and to a data communication network; and a memory, communicatively coupled to the processor and storing:

an access point module to connect with the plurality of Wi-Fi 7 access points on the data communication network;

an access point grouping module to form a multiple access point coordination group from two or more of the plurality of Wi-Fi 7 access points, wherein the two or more of the plurality of Wi-Fi 7 access points at least partially overlap in radio signal coverage area, wherein the access point module to receive a probe request of the station from each at least two of the at least two of the two or more Wi-Fi 7 access points, wherein the probe requests are each sourced from the station while within the at least partially overlapped radio signal coverage area;

a selection module to select one of the at least two of the two or more access points to respond to the probe request with a probe response, based at least on an Received Signal Strength Indicator (RSSI) value associated with the probe requests, wherein a single probe response is transmitted to the station, in response to the multiple probe requests, by notifying the selected access point to send the single probe response including a Reduced Neighbor Report (RNR) data providing connection information for the at least two access points, and wherein the other of the at least two Wi-Fi 7 access points refrain from sending additional probe responses to the station.

12. The method of claim 10, wherein the a first probe request received from a first Wi-Fi 7 access point and a second probe request received from a second Wi-Fi 7 access point have a common BSSID, wherein the first and second Wi-Fi 7 access points are from the multiple access point coordination group.

13. The method of claim 10, wherein a first probe request received from a first Wi-Fi 7 access point and a second probe request received from a second Wi-Fi 7 access point have different BSSIDs, wherein the first and second Wi-Fi 7 access points are from the multiple access point coordination group.

14. The method of claim 10, wherein the step of creating the multiple access point coordination group is automatically created based on at least current network statistics and current access point conditions concerning the plurality of Wi-Fi 7 access points.

15. The method of claim 10, wherein the step of selecting one of the at least two of the two or more access points to respond is based on at least current network statistics and current access point conditions concerning the at least two access points.

16. The method of claim 10, further comprising: generating the RNR data by the selected access point, wherein the RNR data includes a BSSID of at least one access point not selected to transmit the single probe response.

17. The method of claim 10, further comprising receiving notification of a connection request from the station, to connect to an access point included in the RNR, although not selected to transmit the single probe response.

18. The method of claim 10, wherein the step of creating a multiple access point coordination group is on-the-fly in response to receiving the probe request.

19. The method of claim 10, wherein responsive to having information for synchronous evaluation, redirecting, by the web extension, the web request to display a web page to bypass the browser extension holding page.

20. The Wi-Fi controller of claim 11, wherein the a first probe request received from a first Wi-Fi 7 access point and a second probe request received from a second Wi-Fi 7 access point have a common BSSID, wherein the first and second Wi-Fi 7 access points are from the multiple access point coordination group.

* * * * *